United States Patent [19]

Southwick et al.

[11] Patent Number: 5,292,795
[45] Date of Patent: Mar. 8, 1994

[54] VERY FINE STABLE DISPERSIONS OF BLOCK COPOLYMERS

[75] Inventors: Jeffrey G. Southwick, Houston; David M. Austgen, Jr., Missouri City, both of Tex.

[73] Assignee: Shell Oil Company, Houston, Tex.

[21] Appl. No.: 880,946

[22] Filed: May 8, 1992

[51] Int. Cl.$^5$ ............... C08L 57/00; C08L 95/00; C09D 5/02
[52] U.S. Cl. .................. 524/562; 524/60; 524/68; 524/69; 526/329.2
[58] Field of Search ............ 524/562, 68; 526/329.2

[56] References Cited

U.S. PATENT DOCUMENTS

| | | | |
|---|---|---|---|
| 2,918,391 | 12/1959 | Hornibrook | 524/562 |
| 3,432,455 | 3/1969 | Rasicci | 260/29.7 |
| 3,480,578 | 11/1969 | Witt | 260/237 |
| 3,506,604 | 4/1970 | Benjamin | 260/29.7 |
| 3,513,120 | 5/1970 | Pohlemann | 526/329.2 |
| 3,962,197 | 6/1976 | Khanna | 526/329.2 |
| 4,001,159 | 1/1977 | Imai et al. | 524/562 |
| 4,061,833 | 12/1977 | Pelletier et al. | 524/562 |
| 4,199,490 | 4/1980 | Kamiya et al. | 260/29.7 |
| 4,252,852 | 2/1981 | Goth | 524/562 |
| 4,522,972 | 6/1985 | Mondt et al. | 524/562 |
| 4,912,184 | 3/1990 | Akasaki et al. | 526/329.2 |
| 4,937,282 | 1/1990 | Pfoehler et al. | 524/820 |
| 5,212,220 | 5/1993 | Gelles | 524/60 |

FOREIGN PATENT DOCUMENTS

| | | | |
|---|---|---|---|
| 0749266 | 10/1970 | Belgium | 524/562 |
| 151456 | 10/1981 | German Democratic Rep. | |
| 9015102 | 12/1990 | PCT Int'l Appl. | 524/562 |
| 475367 | 11/1976 | U.S.S.R. | |

OTHER PUBLICATIONS

U.S. application Ser. No. 853,645, filed Mar. 18, 1992, Gelles et al.

*Primary Examiner*—Paul R. Michl
*Assistant Examiner*—Olga Asinovsky
*Attorney, Agent, or Firm*—Donald F. Haas

[57] ABSTRACT

A stable polymer dispersion having an average particle size of no more than 1 micron comprising water, a surfactant and a polymer comprising at least one conjugated diolefin block and/or vinyl aromatic hydrocarbon block and at least one acrylic monomer block with the structure

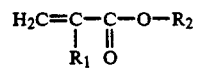

wherein $R_1$ is selected from the group consisting of hydrogen, phenyl and alkyl radicals which are linear or branched and contain from 1 to 10 carbon atoms, and $R_2$ is a cyclic or non-cyclic alkyl radical which is branched at the first carbon atom, contains from 1 to 14 carbon atoms and may contain a tertiary amine or an ether linkage.

6 Claims, No Drawings

VERY FINE STABLE DISPERSIONS OF BLOCK COPOLYMERS

BACKGROUND OF THE INVENTION

This invention relates to stable dispersions of polymers of conjugated dienes. More specifically, it relates to such dispersions which contain only low levels of surfactant.

It is known that polymers can be obtained by an anionic copolymerization of a conjugated diene compound and, optionally, an alkenyl arene compound by using an organic alkali metal initiator. Polymers have been produced which comprise these different monomers such as polystyrene and butadiene or isoprene or blocks thereof. These polymers may have configurations which are linear, radial or star, i.e. many arms radiating from a central core. In block copolymers, the proportion of thermoplastic blocks to elastomeric blocks and the relative molecular weights of each of these blocks is balanced to obtain a rubber having unique performance characteristics.

It has been found advantageous to prepare latexes of these polymers in order to obtain products with different properties. For instance, either protective coatings or adhesive films can be formed on surfaces by evaporating water from latexes containing high molecular weight polymers. Similar films of high molecular weight block copolymers are usually formed by hot melt or solvent evaporation. These latexes are comprised of the polymer, stabilizing surfactant(s), water and possibly coalescing solvents.

It has proved difficult to make such dispersions without using relatively high levels of surfactants, for instance 4 phr (parts per hundred rubber) sodium dodecyl sulfate (SDS), because styrenic block copolymers are incompatible with water and readily coagulate. In end uses such as adhesives and moisture resistant coatings, that much surfactant cannot be tolerated because adhesive tack is destroyed by the migration of surfactant to the surface and surfactant allows a pathway for moisture ingress in coatings. Adding functionality to the diene portion of the molecule has been tried as a way to reduce the amount of surfactant necessary to make dispersions of less than 1 micron particle size. For instance, polymers described in U.S. Pat. No. 4,578,429 (carboxylic acid or anhydride, such as maleic acid or anhydride, functionalized polymers) have been tried but these still require 2 phr of surfactant to achieve 1 micron particle size.

We have found that stable polymer dispersions with an average particle size of less than one micron can be made with the polymers of this invention. Such fine polymer dispersions are desirable because they do not coagulate, settle or cream quickly and fine particle sizes are known to be advantageous in the coalescence of homogeneous films.

SUMMARY OF THE INVENTION

The present invention is a stable polymer dispersion having an average particle size of no more than 1 micron which comprises water, a surfactant and a polymer of a conjugated diolefin which contains an acrylic monomer as part of the polymer backbone. The polymer used in the composition of the present invention is comprised of at least one conjugated diolefin block and/or vinyl aromatic hydrocarbon block and at least one acrylic monomer block with the structure

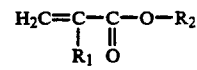

where $R_1$ is hydrogen, phenyl or an alkyl radical which is linear or branched and has from 1 to 10 carbon atoms and $R_2$ is an alkyl radical which is branched at the first carbon atom, has from 1 to 14 carbon atoms, may contain a tertiary amine or an ether linkage and may be a cyclic hydrocarbon.

These polymers are functionalized in that they contain, in the polymer backbone, acrylic, especially methacrylate, functionality. This provides the polymer with strongly reactive and interactive chemical groups. In the formula above, it is important that $R_2$ be branched at the first carbon because branching makes the monomer easier to polymerize. An example is t-butyl which has the formula:

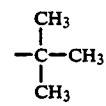

It is preferred that the acrylic monomers be alkyl methacrylates and the preferred alkyl methacrylate is tertiary butyl methacrylate (TBMA).

The invention also comprises an adhesive containing such polymer and a tackifying resin. Further, it is preferred that the tackifying resin comprise from about 20 to about 400 parts by weight per 100 parts rubber (phr). The preferred structure for use in this invention is a linear styrene-isoprene-styrene-tertiary butyl methacrylate block copolymer.

DETAILED DESCRIPTION OF THE INVENTION

The polymers which may be used according to the present invention are polymers of conjugated dienes and/or vinyl aromatic hydrocarbons and acrylic monomers of the formula described above such as alkyl methacrylates or derivatives of alkyl methacrylates such as hydrolyzed alkyl methacrylates or anhydride derivatives thereof. Other suitable acrylic monomers include acrylates, such as t-butyl acrylate; cyclic alkyl methacrylates, such as 2,6-dimethylcyclohexyl methacrylate; and acrylates in which the alkyl group contains an ether linkage, such as tetrahydrofuran acrylate. Copolymers containing two or more conjugated dienes are useful herein. Polymers containing no dienes are useful herein. Copolymers of conjugated dienes and acrylic monomers with vinyl aromatic monomers are preferred and both random and block copolymers thereof are useful herein. The description which follows is described in terms of block copolymers of conjugated dienes, alkyl methacrylates and vinyl aromatic hydrocarbons but it is applicable also to the other polymers described in this paragraph. This means that this invention encompasses functionalized polymers which are not block copolymers but which incorporate the functionality as described below.

The present invention encompasses polymers which are both high and low in molecular weight, as well as in between. High molecular weight polymers include those up to several million molecular weight as defined by gel permeation chromatography (GPC) peak molecular weight of the main species. Low molecular weight polymers include those of only 1000 molecular weight or even less. In all cases these polymers contain both conjugated dienes and acrylic monomers (alkyl methacrylates).

The preferred base polymers of the present invention are block copolymers of conjugated dienes, acrylic monomers such as alkyl methacrylates or their derivatives and vinyl aromatic hydrocarbons. Such block copolymers may be multiblock copolymers of varying structures containing various ratios of the monomers including those containing up to about 60% by weight of vinyl aromatic hydrocarbon. At higher vinyl aromatic hydrocarbon contents, the polymers are not elastomeric and would not be useful for adhesives, sealants and flexible coatings. Thus, multiblock copolymers may be utilized which are linear or radial, symmetric or asymmetric, and which have structures represented by the formulae, ABAC, ABC, BC, BAC, CABAC, CBC, $(CB)_nX$, $(BC)_nX$, $(CB)_nXA_m$, $(BC)_nXA_m$, $(CB)_nXB_m$, $(BC)_nXB_m$, etc. where A is the vinyl aromatic hydrocarbon, B is the diene, C is the acrylic monomer, X is a coupling agent and n and m are integers from 1 to 50. These are just some of the structures possible. Their finite number is not meant to limit the scope of the invention. It is not necessary but B can be a polymer block of a conjugated diene that has been hydrogenated. Hydrogenation of the diene is preferred in applications requiring superior thermal stability.

It may be desirable to functionalize these block copolymers of methacrylate and rubber. However, the routes to acid functionalizing involve exposing the polymer to: (1) heat which eliminates isobutylene and water to form a methacrylic anhydride which then forms methacrylic acid upon exposure to water, or (2), hydrolysis of the ester group by heating (70°-90° C.) a polymer solution in the presence of an acid or acid catalyst. Both routes can possibly degrade and/or crosslink unsaturated rubber if not done carefully. To circumvent this problem it is preferred that the rubber block be hydrogenated.

The preferred polymers for use herein are block copolymers which contain a block of conjugated diene, 2 blocks of a vinyl aromatic hydrocarbon and a block of alkyl methacrylate because such polymers combine the physical strength of styrenic block copolymers with the water dispersibility characteristics of acrylics.

The block copolymers may be produced by any well known block polymerization or copolymerization procedures including the well-known sequential addition of monomer techniques, incremental addition of monomer technique or coupling technique. As is well known in the block copolymer art, tapered copolymer blocks can be incorporated in the multiblock copolymer by copolymerizing a mixture of conjugated diene and vinyl aromatic hydrocarbon monomers utilizing the difference in their copolymerization reactivity rates. The manufacture of such polymers containing alkyl methacrylates is described in U.S. Pat. No. 5,002,676 and copending commonly assigned application Ser. No. 525,812, filed May 21, 1990, both of which are herein incorporated by reference.

Conjugated dienes which may be utilized to prepare the polymers and copolymers include those having from 4 to 8 carbon atoms and also include 1,3-butadiene, 2-methyl-1,3-butadiene(isoprene), 2,3-dimethyl-1,3-butadiene, 1,3-pentadiene, 1,3-hexadiene and the like. Mixtures of such conjugated dienes may also be used. The preferred conjugated dienes are 1,3-butadiene and isoprene.

Vinyl aromatic hydrocarbons which may be utilized to prepare copolymers include styrene, o-methylstyrene, p-methylstyrene, p-tertbutylstyrene, 2,4-dimethylstyrene, alpha-methylstyrene, vinylnapthalene, vinylanthracene and the like. The preferred vinyl aromatic hydrocarbon is styrene.

Alkyl methacrylates are preferred for use herein and those employed herein include methacrylates wherein the alkyl group has up to 14 carbon atoms inclusive. Derivatives of these polymers are also included herein, such as, for example, polymers with partially or completely acidified methacrylate groups, their anhydrides, their ionomers, their reaction products with alcohols and amines, and the like. Derivatives of alkyl methacrylates include methacrylic acid, methacrylic acid salts (for example, zinc, sodium and quaternary ammonium salts) and anhydrides formed between adjacent acid units by heating. This derivitization reaction can be performed in situ with reactive esters such as t-butyl or 1,1-dimethyl alkyl ester. Illustrative of such methacrylate esters are methyl methacrylate, ethyl methacrylate, sec-butyl methacrylate, t-butyl methacrylate, i-amyl methacrylate, hexyl methacrylate, decyl methacrylate and dodecyl methacrylate. Largely because of ease of polymerization, the preferred alkyl methacrylates are branched-butyl methacrylates, i.e., iso-butyl methacrylate and t-butyl methacrylate. The desired poly(alkyl methacrylate) block is produced by directly polymerizing the corresponding alkyl methacrylate monomer or alternatively the desired block is obtained by polymerizing a more easily polymerizable methacrylate and subsequently transesterifying the product to introduce the desired alkyl group. It is also possible to copolymerize randomly or by sequential addition two or more different acrylic monomers in the acrylic monomer block. Tertiary butyl methacrylate (TBMA) is preferred because of ease of purification and polymerization, and because it undergoes thermolysis at temperatures as low as about 180° C.

The present invention works with both unhydrogenated and hydrogenated polymers. Hydrogenated ones are useful in certain circumstances. While unhydrogenated diene polymers have a number of outstanding technical advantages, one of their principal limitations lies in their sensitivity to oxidation. This can be minimized by hydrogenating the copolymers, especially in the diene blocks. The hydrogenation of these polymers and copolymers may be carried out by a variety of well established processes including hydrogenation in the presence of such catalysts as Raney Nickel, noble metals such as platinum, palladium and the like and soluble transition metal catalysts. Titanium biscyclopentadienyl catalysts may also be used. Suitable hydrogenation processes which can be used are ones wherein the diene-containing polymer or copolymer is dissolved in an inert hydrocarbon diluent such as cyclohexane and hydrogenated by reaction with hydrogen in the presence of a soluble hydrogenation catalyst. Such processes are disclosed in U.S. Pat. Nos. 3,113,986, 4,226,952, 5,039,755 and Reissue 27,145, the disclosures of which are herein incorporated by reference. The polymers are hydrogenated in such a manner as to produce hydrogenated polymers having a residual unsaturation content in the polydiene block of less than about 20%, and preferably as close to zero percent as possible, of their original unsaturation content prior to hydrogenation.

The molecular weights of these polymers may range from 1000 to 1,000,000, preferably from 20,000 to 200,000. The vinyl aromatic hydrocarbon block molecular weight generally ranges from 4,000 to 30,000 and the conjugated diolefin block molecular weight generally ranges from 20,000 to 175,000. The molecular weight of the acrylic monomer block should be in the range from 142 to 30,000 because 142 represents the molecular weight of one unit and molecular weights greater than 30,000 may form blocks that are so large that their diffusion to the solid-aqueous interface is impaired.

The acrylic monomer content of the polymer is generally no more than about 20% but acrylic monomer contents of up to 70% are possible. Generally, the acrylic monomer may be present in the polymer in an amount from about 1% to about 20% because lower amounts will not provide the advantages of the present invention and higher amounts are not advantageous from a cost standpoint. All percentages expressed above are weight percentages based on the total weight of the block copolymer.

The dispersions of the invention are made by starting with a solution of the polymer in solvents such as cyclohexane or toluene or blends containing cyclohexane or toluene and various cosolvents such as methylethyl ketone, ethyl acetate, isopropyl alcohol, methyl isobutylketone or isobutyl isobutyrate. In most instances, it will be convenient to use the polymer cement directly from the polymerization step. The polymer cement is emulsified by adding it to water which contains from 0.1 to 10 weight percent at least one surfactant, preferably less than 4 percent if the latex is to be used in an adhesive. It is preferred that the polymer cement be added slowly, preferably in increments, to a known volume of water containing the surfactant. This is important because this procedure promotes the efficient preparation of cement-in-water emulsions with small average drop sizes. Other preferred elements of the process include using at least one anionic surfactant because they are more efficient emulsifiers of the cement emulsions than are cationic or nonionic surfactants. The final emulsion may contain up to 70 weight percent of the cement as the dispersed phase. This means that although the emulsion is water continuous, it can contain as little as 30% water. The solvent is removed from the emulsion by evaporating solvent under vacuum and/or elevated temperature. Excess water may be removed at the same time or later in order to concentrate the resulting latex to the desired percent solids.

In a preferred embodiment of the present invention, a cosolvent is present in the cement to assist in making very fine stable dispersions or emulsions as described in copending commonly assigned application "Process for Making Submicron Stable Latexes of Block Copolymers", filed concurrently herewith. The cosolvent should be used in an amount from 5 weight percent to 50 weight percent of the total solvent in the cement. If less than that amount is used, then there will be little effect on emulsion droplet size and therefore, on latex particle size, and if more is used, then the copolymer will be insufficiently solubilized in the solvent/cosolvent blend and unstable emulsions will be formed. The cosolvent should be chosen on the basis of its compatibility with or affinity for the particular polymer which is to be emulsified. In the case of the present polymers containing polar functional groups, the cosolvent should be polar in nature because this effectively reduces the viscosity of the cement at a given polymer level. Examples of cosolvents which are polar in nature include isopropyl alcohol, methyl ethyl ketone, acetone, isobutyl isobutyrate, ethyl acetate, methyl isobutyl ketone, n-butyl alcohol and isopropyl acetate.

A variety of conventional emulsifiers or surfactants and mixtures of emulsifiers or surfactants can be used to stabilize the polymer dispersions. Such surfactants include anionic, nonionic and cationic surfactants. Mixtures of nonionic surfactants with either anionics or cationics are sometimes especially effective. The cationics most widely used are salts of fatty amines, amido amines and imidazolines. The anionics most widely used include sulfonates and sulfates with the general formulas $R\text{-}SO_3M$ and $R\text{-}OSO_3M$ where R represents a hydrophobic moiety and M represents an alkali metal. Examples include sodium dodecyl sulfate, sodium lauryl sulfate, sodium salt of sulfated Neodol ® alcohols, sodium salts of sulfated Neodol ® ethoxylates, sodium dodecyl benzene sulfonate, sodium alkyl naphthalene sulfonate and sodium dioctyl sulfosuccinate. Salts of sulfated alkyl-phenol ethoxylates are also effective anionic emulsifiers. Examples of effective nonionic surfactant emulsifiers include the family of alkyl-phenol ethoxylates represented by the formula $R\text{-}(OC_2H_4)_nOH$, where R is usually an octyl or nonyl chain and n has a value from 1 to 35, preferably 4 to 15.

Specific examples of surfactants which are useful herein include Neodol ® 25-S, Neodol ® 23-3S, Neodol ® 23-9S, Neodol ® 45-S, Alipal ® EP-110, Alipal ® EP-120, Calsoft F90, Nekal ® BA-77, Emcol 4500, octyl phenol ethoxylates having 1 to 35 ethylene oxide groups and nonyl phenol ethoxylates having 1 to 35 ethylene oxide groups such as the Igepal ® CA and CO series sold commercially by Rhone-Poulenc. Water soluble nonionic block copolymers are also frequently used to stabilize latexes. Examples of the latter include the Synperonic T range of polypropylene oxide - polyethylene oxide block copolymers from ICI.

Surfactants should be used in as low an amount as possible because their presence in adhesive films and protective coatings formed by drying the water from this type of dispersion is detrimental. Surfactants reduce adhesive tack and increase water penetration through protective coatings. It is possible to use less than 2 phr of surfactant and achieve stable dispersions of 1 micron or less because of the use of the polymers described herein.

The process of the present invention produces polymer latexes which are very stable and very fine, i.e., they have an average particle size of less than one micron. Such polymer latexes are useful for formulating water-based adhesives including pressure sensitive, contact and construction mastic adhesives, especially where adhesion to polar surfaces is desirable. Such latexes are also useful for producing water-based coatings, especially with high tensile strength, with little or no solvent.

Water based coatings and adhesives containing methacrylate groups can be crosslinked by a variety of well-known crosslinking agents. The methacrylic acid functional form of these polymers is preferred for the crosslinking reactions. Examples of useful crosslinking agents include Cymel ® resins (based on either melamine or urea formaldehyde chemistry); zirconium salt complexes such as Bacote 20 from Magnesium Electron; zinc, aluminum, or chromium salts; polyaziridines, diols, diamines and diisocyanates.

Particularly useful technologies for crosslinking these polymers coincident with the evaporation and film formation from water are the use of Bacote 20 and zinc ammonium carbonate salts. These compounds can be mixed with the polymer latex for an extended period of time and will only crosslink chains during drying of the film. This behavior in the industry has been termed good "pot life stability." Crosslinking of CBC, CABC, CABAC, or coupled $(BC)_nX$ Polymers can give coatings and adhesives with enhanced high temperature and solvent resistant properties. Water-based contact, mastic, pressure sensitive and laminating adhesives can be made with dispersions of these polymers and their performance enhanced by crosslinking the adhesives.

For adhesives, it is necessary to add an adhesion promoting or tackifying resin that is compatible with the elastomeric isoprene block. A common tackifying resin is a diene-olefin copolymer of piperylene and 2-methyl-2-butene having a softening point of about 95° C. This resin is available commercially under the tradename Wingtack 95 and is prepared by the cationic polymerization of 60% piperylene, 10% isoprene, 5% cyclopentadiene, 15% 2-methyl-2-butene and about 10% dimer, as taught in U.S. Pat. No. 3,577,398 incorporated by reference. Other tackifying resins of the same general type may be employed in which the resinous copolymer comprises 20–80 weight percent of piperylene and 80–20 weight percent of 2-methyl-2-butene. The resins normally have softening points (ring and ball) between about 800° C. and about 1150° C.

Other adhesion promoting resins which are also useful in the compositions of this invention include hydrogenated rosins, esters of rosins, polyterpenes, terpenephenol resins and polymerized mixed olefins. To obtain good themo-oxidative and color stability, it is preferred that the tackifying resin be a saturated resin, e.g., a hydrogenated dicyclopentadiene resin such as Escorez ® 5000 series resin made by Exxon or a hydrogenated polystyrene or polyalphamethylstyrene resin such as Regalrez ® resin made by Hercules.

The amount of adhesion promoting resin employed varies from 20 to 400 parts by weight per hundred parts rubber (phr), preferably between 100 to 350 phr. The rubber referred to herein is the polymer used in the adhesive composition.

The selection of the particular tackifying agent is, in large part, dependent upon the specific block copolymer employed in the respective adhesive composition. In the manufacture of disposable articles such as diapers, sanitary napkins and bed pads, there is the additional consideration of having a substantially white or clear adhesive composition.

The adhesive composition of the instant invention may contain plasticizers, such as rubber extending plasticizers, or compounding oils or liquid resins. Rubber compounding oils are well-known in the art and include both high saturates content oils and high aromatics content oils. Preferred plasticizers are highly saturated oils, e.g. Tufflo ® 6056 oil made by Arco. The amounts of rubber compounding oil employed in the invention composition can vary from 0 to 100 phr, and preferably between 0 to 60 phr.

Optional components of the present invention are stabilizers which inhibit or retard heat degradation, oxidation, skin formation and color formation. Stabilizers are typically added to the commercially available compounds in order to protect the polymers against heat degradation and oxidation during the preparation, use and high temperature storage of the adhesive composition.

Additional stabilizers known in the art may also be incorporated into the adhesive composition. These may be for protection during the life of the article against, for example, oxygen, ozone and ultraviolet radiation. However, these additional stabilizers should be compatible with the essential stabilizers mentioned hereinabove and their intended function as taught herein.

EXAMPLE 1

Dispersions of various polymers in water were formed by dissolving the polymer in cyclohexane, to a concentration of 20% polymer, emulsifying the solution by sonification into water containing surfactant and/or polymeric stabilizers and removing solvent with a rotovap. The stability of these dispersions in water is a function of the chemistry of the polymer and the stabilizing ability of the surfactant and/or stabilizers. Dispersions of S-B-S, S-B-S-TBMA, and S-B-S-MA rubbers (7,000-35,000-7,000 MW; 7,000-35,000-7,000 MW and 9.1% TBMA, and 7,000-35,000-7,000 MW and 5.7% MA, respectively) were prepared with 0.5, 1 and 2 phr sodium dodecyl sulfate (SDS) by sonifying equal parts of aqueous surfactant solution with the cyclohexane polymer solution and removing solvent with a rotovap. The percent TBMA in these polymers was determined by Nuclear Magnetic Resonance Spectroscopy. The results are shown in Table 1.

The S-B-S-TBMA and S-B-S-MA polymers mentioned above, and their hydrogenated analogs mentioned below, are in fact not synthetically prepared with 100% yield. A competing side coupling reaction occurs during the polymerization of the methacrylate block giving S-B-S-M-S-B-S (coupled triblocks). Analysis of these polymers indicates that 70% of the material is S-B-S-TBMA (or MA), and 30% of the material is the coupled triblock. The same ratio of tetra block (S-EB-S-TBMA (or MA)) to coupled triblock is observed for the hydrogenated version.

The S-B-S dispersions were unstable and formed large clumps of rubber (coagulum) in the water. The S-B-S-TBMA and S-B-S-MA dispersions formed stable dispersions of approximately 1.0 micron and 0.5 micron log normal intensity average particle sizes, respectively, even with only 0.5 phr surfactant. These stable dispersions, when coated in thin films, coalesced into high tensile strength films at 150° C. Adhesives and coatings applications are increasingly looking to water based systems to reduce pollution. For water based systems to adequately function as either an adhesive or moisture resistant coating, only low levels of surfactant can be tolerated. These results show that stable TBMA or MA containing dispersions can be made with 0.5 phr of SDS. Prior experience has shown that 2 phr SDS is necessary for stable maleic anhydride functionalized block copolymers.

TABLE 1

| | Preparation of Dispersions | | | | |
|---|---|---|---|---|---|
| Solution | Viscosity cp | Surfactant phr | Size micron | Stable? | Film Tensile psi |
| 20% SBS | 160 | 2 | — | No | — |

TABLE 1-continued

Preparation of Dispersions

| Solution | Viscosity cp | Surfactant phr | Size micron | Stable? | Film Tensile psi |
|---|---|---|---|---|---|
| | | 1 | — | No | — |
| | | 0.5 | — | No | — |
| 20% SBS-TBMA | 347 | 2 | 1.67 | Yes | 2285 |
| | | 1 | 1.12 | Yes | 2990 |
| | | 0.5 | 0.97 | Yes | 1659 |
| 20% SBS-MA | 1100 | 2 | 0.50 | Yes | 1878 |
| | | 1 | 0.56 | Yes | 2342 |
| | | 0.5 | 0.79 | Yes | 1092 |

EXAMPLE 2

Dispersions were also prepared with hydrogenated diene polymers. In this case S-EB-S (7,000-35,000-7,000 MW), S-EB-S-TBMA (7,000-35,000-7,000 MW with 5,000 MW TBMA block) and S-EB-S-MA (7,000-35,000-7,000 MW with 3,000 MW MA block) were dissolved in a solvent blend of 80 parts cyclohexane and 20 parts methyl ethyl ketone. Emulsions were prepared by sonifying equal parts of these polymer solutions with aqueous surfactant solutions containing varying amounts of sodium dodecyl sulfate. Emulsion particle sizes were measured by dynamic light scattering.

Stabilities of the emulsions were rated after one month storage at room temperature (nominally 23° C). The data are compiled in Table 2. Emulsions were rated unstable if solid rubber chunks were observed. The partially stable emulsion had creamed, that is the organic phase had risen to the top of the jar, but this cream could be easily re-dispersed into the water by shaking in one's hand. Stable emulsions showed essentially no changes during one month storage. We have found that emulsion stability (before solvent removal) is predictive of the final dispersion stability (after solvent removal by rotovap).

TABLE 2

Comparison of the Dispersibility in Water of Methacrylate Modified SEBS Polymers with Corresponding SEBS Polymers

| Solution | Viscosity cp | Surfactant phr | Size micron | Stable? |
|---|---|---|---|---|
| 25% SEBS | 2300 | 4 | 0.48 | Yes |
| | | 2 | 0.94 | No |
| 20% SEBS-TBMA | 1500 | 1 | 1.5 | Partially |
| | | 0.6 | — | No |
| 20% SEBS-MA | 2345 | 2 | 0.41 | Yes |
| | | 1.25 | 0.73 | Yes |
| | | 0.5 | 0.90 | Yes |

The data demonstrate that incorporating a methacrylate block onto a hydrogenated S-EB-S polymer gives polymers which can be dispersed in water with less surfactant than the corresponding S-EB-S. The data show that a 5,000 MW tert-butyl methacrylate block improved water dispersibility, but that conversion of this methacrylate ester to a methacrylic acid block drastically improves dispersibility in water. Stable dispersions were formed of S-EB-S-MA polymers with only 0.5 phr of sodium dodecyl sulfate. This surfactant level is equivalent to surfactant concentrations normally used in emulsion polymerizations. Low surfactant dispersions are required in order to formulate adequately performing water-base adhesive systems.

EXAMPLE 3

A quantitative measure of stability was performed on polymers described in Example 2. The S-EB-S polymer was dissolved in an 80/20 mixture of cyclohexane/methyl ethyl ketone (MEK) to a concentration of 20%. A similar 20% solution of the S-EB-S-MA polymer was prepared in a 60/40 blend of cyclohexane and MEK. These solvent blends have been found to be optimum for each polymer. Emulsions were prepared via sonification against an equal part of water containing 0.1% sodium dodecyl sulfate. The solvent was removed with a rotovap. Final surfactant concentration based on polymer was 0.5 phr. The initial solids content of the latexes was about 16 percent.

Table 3 shows the amount of material, expressed as a percentage of the initially dispersed solids, which was retained when the dispersion was poured through a 100 mesh stainless steel screen. These experiments were performed at 1, 7 and 30 days after solvent was removed from the emulsion. The SEBS-MA latex was stable. Only 0.1% of the material was retained on the screen after one day and no additional material could be removed by screening for 30 days. The corresponding S-EB-S latex was unstable. The dispersed rubber particles were coagulating with time over 30 days. After 30 days, 7.5% of the original suspended solids had flocculated.

TABLE 3

Comparison of Dispersion Stability of SEBS and SEBS-MA in Water

| | Cumulative Coagulum (%) Removed With 100 Mesh Stainless Steel Screen | | |
|---|---|---|---|
| | One Day | 7 Days | 30 Days |
| SEBS | 2.7% | 3.5% | 7.5% |
| SEBS-MA | 0.1% | 0.1% | 0.1% |

Dispersions stabilized with 0.5 phr SDS
Initial dispersed solids was 16%

We claim:

1. A stable polymer dispersion having an average particle size of no more than 1 micron comprising water, a surfactant and a block copolymer having a molecular weight of at least 1,000 comprising at least one polymer block formed of a conjugated diene and/or a vinyl aromatic hydrocarbon and at least one acrylic monomer block with the structure

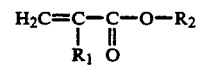

wherein $R_1$ is selected from the group consisting of hydrogen, phenyl and alkyl radicals which are linear or branched and contain from 1 to 10 carbon atoms, and $R_2$ is a cyclic or non-cyclic alkyl radical which is branched at the first carbon atom, contains from 1 to 14 carbon atoms and may contain a tertiary amine or an ether linkage.

2. The dispersion of claim 1 wherein the polymer comprises at least one block of a conjugated diene and at least two blocks of a vinyl aromatic hydrocarbon.

3. The dispersion of claim 2 wherein the acrylic monomer is an alkyl methacrylate.

4. The dispersion of claim 3 wherein the alkyl methacrylate is tertiary butyl methacrylate or methacrylate.

5. An adhesive comprising the dispersion of claim 1 and a tackifying resin.

6. A high tensile strength coating comprising the dispersion of claim 1 coalesced from water.

* * * * *